(12) United States Patent
Kobayashi et al.

(10) Patent No.: US 10,129,019 B2
(45) Date of Patent: Nov. 13, 2018

(54) DP HDCP VERSION CONVERTER

(71) Applicant: MEGACHIPS TECHNOLOGY AMERICA CORPORATION, San Jose, CA (US)

(72) Inventors: Alan Kobayashi, Los Altos, CA (US); Sujan Thomas, Pleasanton, CA (US); Ali Noorbakhsh, Danville, CA (US)

(73) Assignee: MEGACHIPS TECHNOLOGY AMERICA CORPORATION, San Jose, CA (US)

( * ) Notice: Subject to any disclaimer, the term of this patent is extended or adjusted under 35 U.S.C. 154(b) by 157 days.

(21) Appl. No.: 15/278,593

(22) Filed: Sep. 28, 2016

(65) Prior Publication Data

US 2017/0019249 A1   Jan. 19, 2017

Related U.S. Application Data

(63) Continuation of application No. PCT/US2015/023517, filed on Mar. 31, 2015.

(60) Provisional application No. 61/972,923, filed on Mar. 31, 2014.

(51) Int. Cl.
*G06F 21/00* (2013.01)
*H04L 9/06* (2006.01)
*H04L 29/06* (2006.01)

(52) U.S. Cl.
CPC .......... *H04L 9/065* (2013.01); *H04L 63/0428* (2013.01)

(58) Field of Classification Search
CPC ............................. H04L 9/065; H04L 63/0428
See application file for complete search history.

(56) References Cited

U.S. PATENT DOCUMENTS

| | | |
|---|---|---|
| 2005/0228995 A1 | 10/2005 | Kwak et al. |
| 2009/0067625 A1 | 3/2009 | Patel et al. |
| 2011/0122142 A1 | 5/2011 | Wyatt et al. |
| 2012/0063376 A1 | 3/2012 | Kambhatla et al. |
| 2013/0038508 A1 | 2/2013 | Min |
| 2013/0058482 A1* | 3/2013 | Hirayama .......... H04N 21/2541 380/255 |

(Continued)

FOREIGN PATENT DOCUMENTS

EP        2434477        3/2012

OTHER PUBLICATIONS

International Search Report and Written Opinion dated Jun. 25, 2015 in PCT/US2015/023517.

(Continued)

*Primary Examiner* — Jeffrey C Pwu
*Assistant Examiner* — William A Corum, Jr.
(74) *Attorney, Agent, or Firm* — Xsensus, LLP

(57) ABSTRACT

A DisplayPort (DP) High-bandwidth Digital Content Protection (HDCP) version converter that converts an HDCP content protection version from input to output includes a receiver and a transmitter. The receiver receives a serial bit stream transmitted from an upstream device, and decrypts link symbols of the received serial bit stream by use of a decryption unit. The transmitter encrypts, by use of an encryption unit, the link symbols decrypted by the receiver, and converts the encrypted link symbols into a serial bit stream and transmits the serial bit stream to a downstream device. The receiver and the transmitter have the same link configuration.

14 Claims, 4 Drawing Sheets

(56) References Cited

U.S. PATENT DOCUMENTS

2013/0279693 A1 10/2013 Rothschild
2014/0211941 A1* 7/2014 Oh .................... G06F 21/10
　　　　　　　　　　　　　　　　　　　　　　380/201

OTHER PUBLICATIONS

"High-bandwidth Digital Content Protection System" Digital Content Protection LLC, Revision 2.2, Feb. 13, 2013, 72 Pages.
Alan Kobayashi, "DisplayPort™ Ver.1.2 Overview", DisplayPort Developer Conference, Westin Taipei, Dec. 6, 2010, Retrieved on Sep. 27, 2016 from URL: http://www.vesa.org/wp-content/uploads/2010/12/DisplayPort-DevCon-Presentation-DP-1.2-Dec-2010-rev-2b. pdf#search='Displayport+l .2+overview', 33 Pages.
Japanese Office Action dated Aug. 15, 2018 in Japanese Application No. 2016-559197 with partial English language translation.

\* cited by examiner

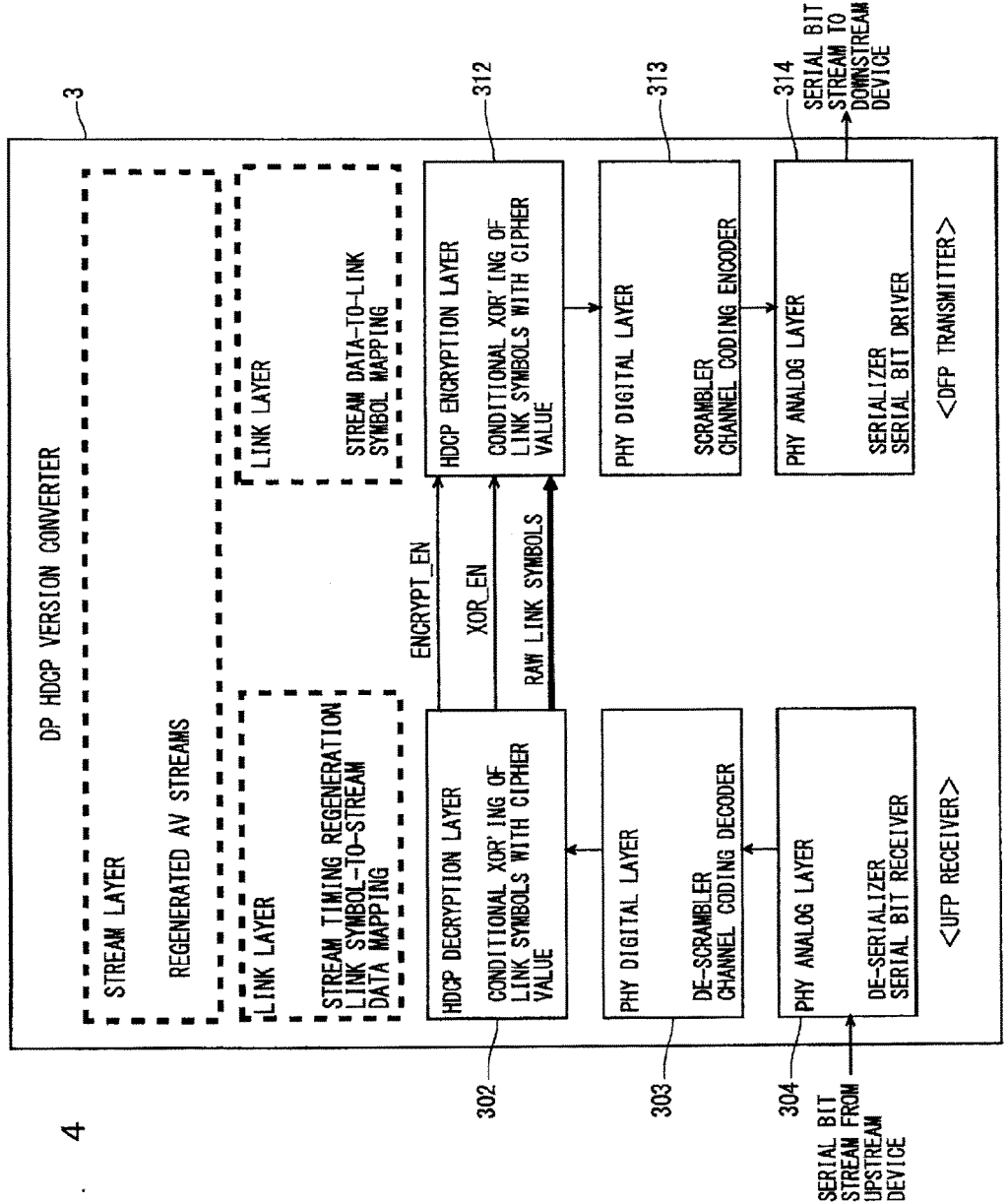

DP HDCP VERSION CONVERTER

CROSS-REFERENCE TO RELATED APPLICATIONS

This application is based upon and claims the benefit of priority from U.S. application Ser. No. 61/972,923, filed Mar. 31, 2014, the entire contents of which are incorporated herein by reference.

TECHNICAL FIELD

The present invention relates to technology for converting a High-bandwidth Digital Content Protection (HDCP) content protection version.

BACKGROUND ART

DisplayPort is known as a digital interface standard. Meanwhile, HDCP is known as technology for protecting content. HDCP specifications can be obtained from www-.digital-cp.com.

SUMMARY OF INVENTION

Problems to be Solved by the Invention

When a device whose input and output comply with DisplayPort (hereinafter, also referred to as DP) converts an HDCP content protection version of an incoming stream, and outputs the stream, simplification of the conversion is desired. Some examples of the conversion are from HDCP Ver.1.3 (HDCP1.3) content protection to HDCP Ver.2.2 (HDCP2.2) content protection, and vice versa (that is, from HDCP2.2 content protection to HDCP1.3 content protection).

The present invention aims to provide technology enabling simplification of conversion of an HDCP content protection version.

Means for Solving the Problems

A DisplayPort (DP) High-bandwidth Digital Content Protection (HDCP) version converter that converts an HDCP content protection version from input to output includes a receiver and a transmitter. The receiver receives a serial bit stream transmitted from an upstream device, and decrypts link symbols of the received serial bit stream by use of a decryption unit. The transmitter encrypts, by use of an encryption unit, the link symbols decrypted by the receiver, and converts the encrypted link symbols into a serial bit stream and transmits the serial bit stream to a downstream device. The receiver and the transmitter have the same link configuration.

Effects of the Invention

Conversion of an HDCP content protection version is simplified.

BRIEF DESCRIPTION OF DRAWINGS

FIG. 4 shows processes in a DP HDCP converter.

DESCRIPTION OF EMBODIMENT

The present disclosure is applied to a DisplayPort(DP)-in, DP-out device that converts an HDCP content protection version from input to output. The present disclosure enables simplification of a DP HDCP version converter supporting Multi Stream Transport (MST) transport format as 1) it allows for a converter without circuitry for either regenerating streams or routing multiple streams, and also as 2) insertion of the converter does not add to MST topology cascade levels.

Details on DisplayPort and MST transport format/topology, and how selective encryption among multiple streams is supported across the MST topology are described in "DisplayPort Standard version 1.2a". "DisplayPort Standard version 1.2a" is hereinafter also referred to as DP1.2a Standard.

Figure 1:
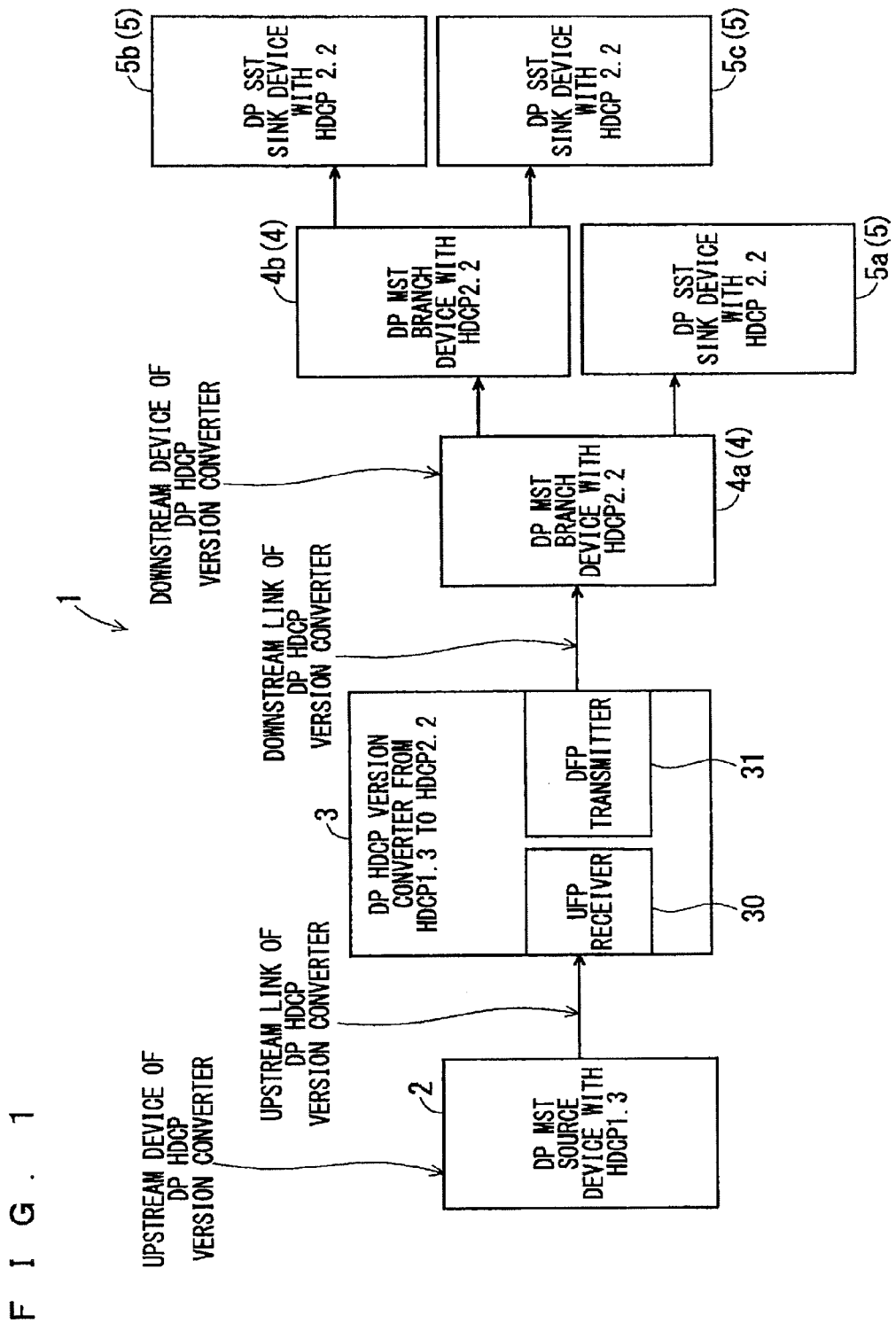
FIG. 1 shows configuration of an image display system 1.

FIG. 1 shows configuration of an image display system 1 including a DP HDCP version converter 3 (hereinafter, also simply referred to as a converter 3) according to the present embodiment. FIG. 1 shows an example of DP MST topology with the DP HDCP version converter 3.

As shown in FIG. 1, the image display system 1 includes a DP MST Source device 2 (hereinafter, also simply referred to as a Source device 2), the converter 3, DP MST Branch devices 4a and 4b (hereinafter, also simply referred to as Branch devices 4a and 4b), and DP Single Stream Transport (SST) Sink devices 5a, 5b, and 5c (hereinafter, also simply referred to as Sink devices 5a, 5b, and 5c). In the image display system 1, images generated by the Source device 2 are displayed in the Sink devices 5a, 5b, and 5c.

The Source device 2, the converter 3, the Branch devices 4a and 4b, and the Sink devices 5a, 5b, and 5c each comply with DP. The Source device 2, the converter 3, and the Branch devices 4a and 4b each support MST. The converter 3 supports not only MST but also SST. The Sink devices 5a, 5b, and 5c each support SST.

The Source device 2 is an upstream device of the converter 3, and is connected to the converter 3 via an upstream link. The Source device 2 generates a serial bit stream protected by HDCP1.3, and outputs the serial bit stream to the converter 3 through use of the upstream link, for example.

The converter 3 converts the HDCP content protection version of the serial bit stream output from the Source device 2 from HDCP1.3 to HDCP2.2, for example, and outputs the serial bit stream protected by HDCP2.2. The converter 3 includes an upstream facing port (UFP) receiver 30 that receives the serial bit stream protected by HDCP1.3 from the Source device 2, and a downstream facing port (DFP) transmitter 31 that transmits the serial bit stream protected by HDCP2.2. The UFP receiver 30 and the DFP transmitter 31 are described in detail later.

The Branch device 4a is a downstream device of the converter 3, and is connected to the converter 3 via a downstream link. The Branch device 4a separates the serial bit stream input from the converter 3 via the downstream link into two serial bit streams, and outputs the serial bit streams. The Branch device 4b separates one of the serial bit streams output from the Branch device 4a into two serial bit streams, and outputs the serial bit streams. The Branch devices 4a and 4b each correspond to HDCP2.2.

The Sink device 5a displays an image based on the other one of the serial bit streams output from the Branch device 4a. The Sink device 5b displays an image based on one of the serial bit streams output from the Branch device 4b. The Sink device 5c displays an image based on the other one of the serial bit streams output from the Branch device 4b. The Sink devices 5a, 5b, and 5c each correspond to HDCP2.2.

Hereinafter, the Branch devices 4a and 4b are each referred to as a Branch device 4 when there is no particular need to distinguish between them. Similarly, the Sink devices 5a, 5b, and 5c are each referred to as a Sink device 5 when there is no particular need to distinguish among them.

<AV Stream Data Path from Source to Sink>

Figure 2:
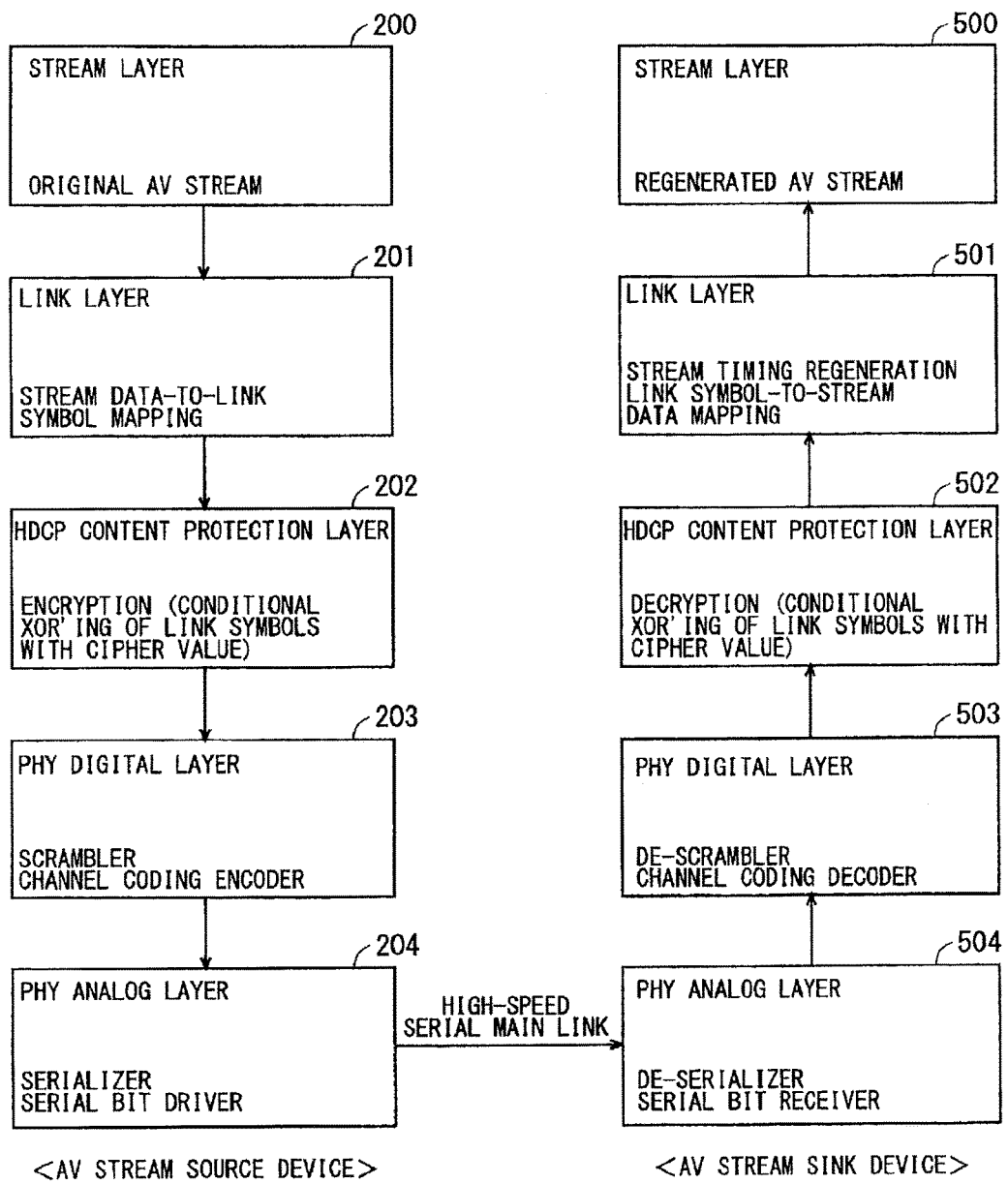
FIG. 2 shows processes in a DP MST Source device and in a DP SST Sink device.

FIG. 2 is a layered diagram of an audio visual (AV) stream data path from a stream source to a stream sink via a high-speed serial link. FIG. 2 shows operation of a DFP transmitter of the Source device 2 on the left side, and shows operation of an UFP receiver of the Sink device 5 on the right side. In the example of FIG. 2, a serial bit stream output from the Source device 2 is directly input into the Sink device 5, and the Source device 2 and the Sink device 5 correspond to HDCP in the same version.

The DFP transmitter of the Source device 2 generates original AV stream data at a stream layer 200. The DFP transmitter then maps the generated AV stream data to link symbols at a link layer 201. The DFP transmitter then encrypts, at an HDCP content protection layer 202, the link symbols to which the AV stream data is mapped. Specifically, the DFP transmitter calculates XOR (exclusive or) of the link symbols and a cipher value to encrypt the link symbols. Next, at a PHY (physical) digital layer 203, a scrambler of the DFP transmitter scrambles the encrypted link symbols, and an encoder of the DFP transmitter performs channel coding (ANSI8B10B) on the scrambled link symbols. Then, at a PHY analog layer 204, a serializer of the DFP transmitter converts the link symbols processed at the PHY digital layer 203 into a serial bit stream, and a serial bit driver of the DFP transmitter outputs the generated serial bit stream. The serial bit stream transmitted from the DFP transmitter of the Source device 2 is input into the Sink device 5 through a high-speed serial main link between the Source device 2 and the Sink device 5.

In the UFP receiver of the Sink device 5, at a PHY analog layer 504, a serial bit receiver receives the serial bit stream from the Source device 2, and a de-serializer converts the received serial bit stream into a parallel signal. Next, in the UFP receiver, at a PHY digital layer 503, a decoder decodes the parallel signal generated at the PHY analog layer 504, and a de-scrambler descrambles a signal obtained through decoding. As a result, link symbols that are encrypted (encrypted link symbols) are obtained. The UFP receiver then decrypts, at an HDCP content protection layer 502, the encrypted link symbols obtained at the PHY digital layer 503. Specifically, the UFP receiver calculates XOR of the encrypted link symbols and the cipher value to decrypt the encrypted link symbols. The UFP receiver then maps the decrypted link symbols to stream data, and regenerates a stream timing at a link layer 501. Framing/stuffing symbols are herein removed from the decrypted link symbols, and the stream data is generated based on the remaining link symbols. An AV stream clock (i.e., a video pixel clock and an audio clock) is not regenerated. The UFP receiver then regenerates, at a stream layer 500, the original AV stream data based on the stream data generated and the stream timing regenerated at the link layer 501. Furthermore, the AV stream clock is regenerated at the stream layer 500. In the Sink device 5, based on the regenerated AV stream data and AV stream clock, a video is displayed, and an audio according to the video is output. As a result, the video and audio generated by the Source device 2 are reproduced in the Sink device 5.

As described above, the HDCP content protection layer resides between the link layer (layer handling mapping between AV stream data and link symbols) and the PHY digital layer (layer handling conversion between link symbols and channel coding characters that are ANSI8B10B channel coding characters for DP link).

<Branch Device>

DP1.2a Standard defines a DP-in, DP-out MST Branch device that routes multiple streams from input port(s) to output port(s) without regenerating original audio visual (AV) streams. The MST specifications of DP1.2a Standard allow the lane counts and link rates to be set independently on the input port(s) and the output port(s) of the MST Branch device that remaps incoming link symbols on its output port(s).

Figure 3:
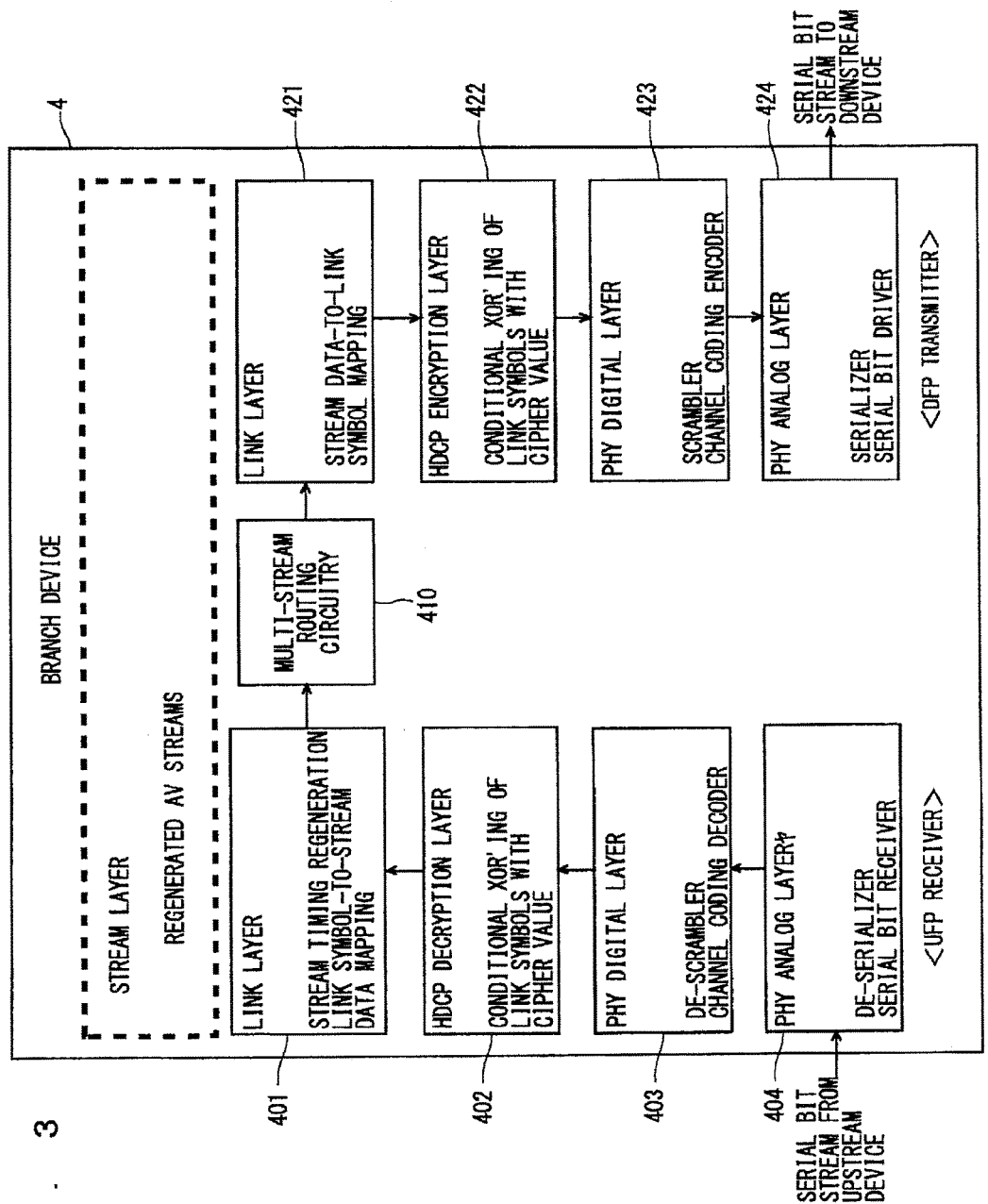
FIG. 3 shows processes in a DP MST Branch device.

FIG. 3 is a layered diagram within the Branch device 4. FIG. 3 shows operation of an UFP receiver of the Branch device 4 on the left side, and shows operation of a DFP transmitter of the Branch device 4 on the right side.

The Branch device 4 routes multiple streams from the input port(s) to the output port(s) via multi-stream routing circuitry without regenerating original AV streams. In the Branch device 4, the link configuration (that is, the combination of link rate and lane count) of the DFP transmitter may be different from that of the UFP receiver.

As shown in FIG. 3, in the UFP receiver of the Branch device 4, at a PHY analog layer 404, a serial bit receiver receives a serial bit stream output from a DFP transmitter of an upstream device of the Branch device 4, and a de-serializer converts the received serial bit stream into a parallel signal. Next, in the UFP receiver, at a PHY digital layer 403, a decoder decodes the parallel signal generated at the PHY analog layer 404, and a de-scrambler descrambles a signal obtained through decoding. As a result, encrypted link symbols are obtained. The UFP receiver then decrypts, at an HDCP decryption layer (HDCP content protection layer) 402, the encrypted link symbols obtained at the PHY digital layer 403 according to HDCP2.2. The UFP receiver calculates XOR of the encrypted link symbols and the cipher value to decrypt the encrypted link symbols. The UFP receiver then maps the decrypted link symbols to stream data, and regenerates a stream timing at a link layer 401.

The stream data generated at the link layer 401 is forwarded through multi-stream routing circuitry 410 to the DFP transmitter of the Branch device 4 based on the regenerated stream timing. Although a single DFP transmitter is shown in FIG. 3, the branch device 4 is provided with multiple DFP transmitters. In a case where multiple stream data pieces are generated at the link layer 401, the multi-stream routing circuitry 410 routes each of incoming multiple stream data pieces to an appropriate DFP transmitter.

The DFP transmitter of the Branch device 4 maps, at a link layer 421, the stream data from the multi-stream routing circuitry 410 to link symbols. The DFP transmitter then encrypts the link symbols according to HDCP2.2 at an HDCP encryption layer (HDCP content protection layer) 422. The DFP transmitter calculates XOR of the link symbols and the cipher value to encrypt the link symbols. Next, at a PHY (physical) digital layer 423, a scrambler of the DFP transmitter scrambles the encrypted link symbols, and an encoder of the DFP transmitter performs channel coding on the scrambled link symbols. Then, at a PHY analog layer 424, a serializer of the DFP transmitter converts the link symbols processed at the PHY digital layer 423 into a serial bit stream, and a serial bit driver of the DFP transmitter outputs the generated serial bit stream. The serial bit stream transmitted from the DFP transmitter of the Branch device 4 is received by a UFP receiver of a downstream device of the Branch device 4.

As described above, since original AV streams are not regenerated in the Branch device 4, no stream layer is necessary. In FIG. 3, a frame showing the unnecessary stream layer is indicated in a dashed line.

<Converter>

FIG. 4 is a layered diagram of the converter 3. In the converter 3 according to the present embodiment, the same link configuration is applied to the UFP receiver 30 and the DFP transmitter 31. This eliminates the need for remapping of the link symbols between the UFP receiver 30 and the DFP transmitter 31. In the present embodiment, by limiting each of the number of physical input ports and the number of physical output ports of the converter 3 to one and by causing the converter 3 to have the same lane count and link rate between the input port and the output port, the need for the converter 3 to perform link symbol remapping is eliminated.

As shown in FIG. 4, in the UFP receiver 30 of the converter 3, at a PHY analog layer 304, a serial bit receiver receives a serial bit stream output from a DFP transmitter of an upstream device (the Source device 2 in the example of FIG. 1) of the converter 3, and a de-serializer converts the received serial bit stream into a parallel signal.

Next, in the UFP receiver 30, at a PHY digital layer 303, a decoder decodes the parallel signal generated at the PHY analog layer 304, and a de-scrambler descrambles a signal obtained through decoding. As a result, encrypted link symbols are obtained.

The UFP receiver 30 then decrypts, at an HDCP decryption layer 302, the encrypted link symbols obtained at the PHY digital layer 303 according to HDCP1.3. The UFP receiver 30 calculates XOR of the encrypted link symbols and the cipher value to decrypt the encrypted link symbols.

In the UFP receiver 30, an HDCP decryption block that performs the process at the HDCP decryption layer 302 decrypts the incoming encrypted link symbols (upstream AV stream link symbols) without knowing what each link symbol represents, and forwards the decrypted link symbols (raw link symbols) to an HDCP encryption block of the DFP transmitter 31 along with an encryption enable control signal (ENCRYPT_EN signal) and an XOR enable control signal (XOR_EN signal).

Furthermore, if an HDCP version of a downstream link does not meet a content security level for certain stream data specified by a security engine of a stream source (the Source device 2), the converter 3 cannot forward the certain stream data to a downstream device. The HDCP decryption block of the UFP receiver 30 thus replaces link symbol(s) of the certain stream data from an upstream device with filler symbol(s) according to the MST specifications of DP1.2a Standard. The HDCP decryption block de-asserts an XOR_EN signal for these filler symbols.

The HDCP encryption block of the DFP transmitter 31 enables a cipher algorithm engine for HDCP encryption when the ENCRYPT_EN signal is asserted at an HDCP encryption layer 312. The HDCP encryption block calculates XOR of the link symbols (AV stream link symbols) from the HDCP decryption block and the cipher value generated by the HDCP encryption block by using the cipher algorithm engine each time the XOR_EN signal is asserted when the ENCRYPT_EN signal is asserted.

In case of HDCP with the MST transport format, the Source device 2 upstream of the converter 3 may choose to encrypt only a certain stream indicated in an Encryption Configuration Field (ECF) of an MST link frame. The ECF indicates a time slot, within a 64-time-slot Multi-stream transport Packet (MTP) encryption, to be enabled (that is, subjected to XOR with the cipher value). It is the responsibility of the HDCP decryption block of the converter 3 to assert/de-assert the XOR_EN signal to the HDCP encryption block according to a value of the ECF of an incoming serial bit stream in the MST transport format. That is to say, the HDCP decryption block of the UFP receiver 30 asserts, according to the value of the ECF of the serial bit stream input into the UFP receiver 30, the XOR_EN signal forwarded to the HDCP encryption block along with the link symbols of the stream to be encrypted.

At a PHY (physical) digital layer 313, the link symbols processed by the HDCP decryption block of the DFP transmitter 31 are scrambled by a scrambler of the DFP transmitter 31, and then undergo channel coding by an encoder of the DFP transmitter 31.

Then, at a PHY analog layer 314, a serializer of the DFP transmitter 31 converts the link symbols processed at the PHY digital layer 313 into a serial bit stream, and a serial bit driver of the DFP transmitter 31 outputs the generated serial bit stream. The serial bit stream transmitted from the DFP transmitter 31 of the converter 3 is received by a UFP receiver of a downstream device (the Branch device 4a in the example of FIG. 1) of the converter 3.

In the present embodiment, the UFP receiver 30 and the DFP transmitter 31 of the converter 3 are each configured by analog circuitry and digital circuitry, for example. The PHY analog layer 304 and the PHY analog layer 314 are each configured by analog circuitry. The PHY digital layer 303, the HDCP decryption layer 302, the HDCP encryption layer 312, and the PHY digital layer 313 are each configured by digital circuitry. The PHY analog layer 304, the PHY digital layer 303, the HDCP decryption layer 302, the HDCP encryption layer 312, the PHY digital layer 313, and the PHY analog layer 314 can respectively be referred to as analog receiving circuitry 304, digital processing circuitry 303, decryption circuitry 302, encryption circuitry 312, digital processing circuitry 313, and analog transmitting circuitry 314. The UFP receiver 30 and the DFP transmitter 31 are each configured by hardware circuitry that does not require software to achieve its functions.

As described above, since original AV streams are not regenerated in the converter 3, no stream layer is necessary. In addition, the same link configuration (lane count and link rate) is applied to the UFP receiver 30 and the DFP transmitter 31 in the converter 3. Herein, mapping of stream data to link symbols depends on the lane count, and insertion of stuffing symbols depends on a ratio of a link bandwidth to an AV stream bandwidth. Therefore, by applying the same link configuration (lane count and link rate) to the UFP receiver 30 and the DFP transmitter 31, remapping of the link symbols is unnecessary. This eliminates the need for circuitry corresponding to the multi-stream routing circuitry 410 of the Branch device 4 as well as the need for the link layer in the converter 3. Conversion of the HDCP content protection version can thus be simplified. As a result, the converter 3 can be simplified. In FIG. 4, frames showing the unnecessary stream layer and link layers are indicated in dashed lines.

<AUX Transactions>

The Source device 2 (see FIG. 1) initiates, according to DP1.2a Standard, various AUX transactions, for example, including:

various message transactions for discovering the topology, reading the capabilities of downstream Sink devices, etc.;

AUX transactions for link management such as link training and link maintenance;

AUX transactions for HDCP authentication and key exchange; and

AUX transactions for implementation-specific purposes.

Various AUX transactions initiated by the Source device 2 are forwarded to the converter 3. In the present embodiment, the converter 3 forwards all AUX transactions except for those for link management and for HDCP authentication and key exchange to the downstream device. The converter 3 thereby avoids adding to the MST topology cascade levels. In other words, the converter 3 does not add to the MST topology cascade levels by forwarding all sideband channel transactions (AUX transactions over DP link) except for those for link management and for HDCP authentication and key exchange. Therefore, in a case where the Branch device is assumed to be able to cascade up to seven devices in the DP specifications, for example, the Branch device can cascade up to seven devices even when there is the converter 3. In order to determine whether to forward or consume the current AUX transaction, the converter 3 checks a command and an address of the AUX transaction. Determination on whether to forward or consume the AUX transaction may be made by hardware logic or firmware. AUX transaction flow control specified in DP1.2a Standard may be used by the converter 3 as needed.

As described above, the present embodiment discloses the device and the method for simplification of the DP HDCP version converter supporting not only SST transport format but also MST transport format. The disclosed device and method allow for HDCP content encryption of multiple streams transported with MST transport format without requiring multi-stream routing circuitry. Furthermore, the disclosed device and method allow the DP HDCP version converter to be added to MST topology without adding to the MST topology cascade levels.

The disclosed device and method set the link rate and lane count of the downstream link to be the same as those of the upstream link, and further forwards the link symbols from the UFP receiver to the DFP transmitter at the HDCP content protection layer that handles HDCP encryption and decryption, instead of the link layer that handles mapping between the link symbols and the AV stream or the stream layer. The method for setting the link rate and lane count of the downstream link to be the same as those of the upstream link is described for an SST Branch device (that is, a PHY (physical) layer repeater) in DP1.2a Standard, but the DP HDCP version converter can be in the MST transport format including selective encryption among multiple AV streams. That is to say, the DP HDCP version converter can transport multiple AV streams including an encrypted AV stream and an unencrypted AV stream.

In the disclosed device and method, the HDCP decryption block of the DP HDCP version converter forwards the decrypted AV stream link symbols to the HDCP encryption block, along with the encryption enable control signal (ENCRYT_EN signal) and the XOR enable control signal (XOR_EN signal). The decryption block asserts/de-asserts the XOR_EN signal based on whether the link symbols need to be encrypted. For the MST case, determination on whether the link symbols are encrypted/unencrypted also requires interpretation, by the decryption block, of the ECF field of an upstream MST link frame according to DP1.2a Standard.

Furthermore, the HDCP decryption block of the UFP receiver replaces the link symbols of certain stream data from the upstream device with filler symbols according to the MST specifications of DP1.2a Standard if the HDCP version of the downstream link does not meet the security level specified by the security engine of the stream source. The HDCP decryption block de-asserts the XOR_EN signal for these filler symbols.

In the disclosed device and method, the HD HDCP version converter forwards all the sideband transactions (that is, AUX transactions) except for those for link management and for HDCP authentication and key exchange. The DP HDCP version converter monitors the AUX command and a 20-bit address field of the AUX transaction, and determines whether to forward or consume and reply to the AUX transaction. As the DP HDCP version converter forwards all MST-related AUX transactions (for example, MST capability discovery and topology discovery), insertion of the DP HDCP version converter does not add to the MST topology cascade levels.

While the image display system 1 including the converter 3 has been described above in detail, the foregoing description is in all aspects illustrative and not restrictive. The above-mentioned various modifications may be used in combination unless any contradiction occurs. It is understood that numerous modifications that have not been described can be devised without departing from the scope of the present invention.

REFERENCE SIGNS LIST

3: DP HDCP version converter
30: UFP receiver
31: DFP transmitter

The invention claimed is:

1. A DisplayPort (DP) High-bandwidth Digital Content Protection (HDCP) version converter that converts an HDCP content protection version from input to output, the DP HDCP version converter comprising:

a receiver receiving a serial bit stream transmitted from an upstream device, and decrypting link symbols of the received serial bit stream by use of decryption circuitry; and a transmitter encrypting, by use of encryption circuitry, the link symbols decrypted by said receiver, and converting the encrypted link symbols into a serial bit stream and transmitting the serial bit stream to a downstream device, wherein said converter has the same lane count and link rate between an input port of the receiver and an output port of the transmitter, and said converter does not perform link symbol remapping between the receiver and the transmitter.

2. The DP HDCP version converter according to claim 1, wherein said decryption circuitry forwards the decrypted link symbols to said encryption circuitry along with an encryption enable control signal and an XOR enable control signal, and asserts/de-asserts said XOR enable control signal based on whether the decrypted link symbols need to be encrypted.

3. The DP HDCP version converter according to claim 2, wherein
said decryption circuitry asserts/de-asserts said XOR enable control signal based on a value in an Encryption Configuration Field (ECF) of a Multi Stream Transport (MST) link frame.

4. The DP HDCP version converter according to claim 2, wherein
said decryption circuitry replaces link symbols of certain stream data from said upstream device with filler symbols, and de-asserts said XOR enable control signal for the filler symbols.

5. The DP HDCP version converter according to claim 1, wherein
said DP HDCP version converter forwards all sideband transactions from said upstream device except for those for link management and for HDCP authentication and key exchange to said downstream device.

6. The DP HDCP version converter according to claim 1, wherein said decryption circuitry:
replaces link symbols of certain stream data from said upstream device with filler symbols;
de-asserts said XOR enable control signal only for the filler symbols; and
asserts said XOR enable control signal for symbols other than the filler symbols.

7. The DP HDCP version converter according to claim 1, wherein
said decryption circuitry is configured to assert/de-assert said XOR enable control signal by interpreting an Encryption Configuration Field (ECF) of a Multi Stream Transport (MST) link frame according to DP1.2a standard.

8. A method performed by a DisplayPort (DP) High-bandwidth Digital Content Protection (HDCP) version converter that converts an HDCP content protection version from input to output, the method comprising:
receiving a serial bit stream transmitted from an upstream device, and decrypting link symbols of the received serial bit stream by use of decryption circuitry;
encrypting, by use of encryption circuitry, the decrypted link symbols;
converting the encrypted link symbols into a serial bit stream; and
transmitting the serial bit stream to a downstream device, wherein
said converter has the same lane count and link rate between an input port of the converter and an output port of the converter, and
link symbol remapping is not performed between the receiver and the transmitter.

9. The method according to claim 1, further comprising:
forwarding the decrypted link symbols to said encryption circuitry along with an encryption enable control signal and an XOR enable control signal; and
asserting/de-asserting said XOR enable control signal based on whether the decrypted link symbols need to be encrypted.

10. The method according to claim 9, further comprising:
asserting/de-asserting said XOR enable control signal based on a value in an Encryption Configuration Field (ECF) of a Multi Stream Transport (MST) link frame.

11. The method according to claim 9, further comprising:
replacing link symbols of certain stream data from said upstream device with filler symbols, and de-asserts said XOR enable control signal for the filler symbols.

12. The method according to claim 8, further comprising:
forwarding all sideband transactions from said upstream device except for those for link management and for HDCP authentication and key exchange to said downstream device.

13. The method according to claim 8, further comprising:
replacing link symbols of certain stream data from said upstream device with filler symbols;
de-asserting said XOR enable control signal only for the filler symbols; and
asserting said XOR enable control signal for symbols other than the filler symbols.

14. The method according to claim 8, further comprising:
asserting/de-asserting said XOR enable control signal by interpreting an Encryption Configuration Field (ECF) of a Multi Stream Transport (MST) link frame according to DP1.2a standard.

* * * * *